US012711279B2

(12) United States Patent
Canciani et al.

(10) Patent No.: US 12,711,279 B2
(45) Date of Patent: Aug. 18, 2026

(54) CONCURRENT WRITINGS IN VERIFIABLE PERSISTENT DATA STRUCTURES

(71) Applicant: TRAENT S.R.L., Milan (IT)

(72) Inventors: Andrea Canciani, Via delle Medaglie d'oro (IT); Claudio Felicioli, Via Giuseppe Cesare Abba (IT); Fabio Severino, Piazza Cairoli (IT)

(73) Assignee: TRAENT S.R.L, Milan (IT)

(*) Notice: Subject to any disclaimer, the term of this patent is extended or adjusted under 35 U.S.C. 154(b) by 48 days.

(21) Appl. No.: 18/869,553

(22) PCT Filed: May 29, 2023

(86) PCT No.: PCT/EP2023/064317

§ 371 (c)(1),
(2) Date: Nov. 26, 2024

(87) PCT Pub. No.: WO2023/232736

PCT Pub. Date: Dec. 7, 2023

(65) Prior Publication Data

US 2026/0023884 A1 Jan. 22, 2026

(30) Foreign Application Priority Data

May 30, 2022 (IT) ........................ 102022000011342

(51) Int. Cl.
*G06F 21/64* (2013.01)
*H04L 9/00* (2022.01)
*H04L 9/08* (2006.01)

(52) U.S. Cl.
CPC ............ *G06F 21/64* (2013.01); *H04L 9/0891* (2013.01); *H04L 9/50* (2022.05)

(58) Field of Classification Search
USPC ............................................................ 726/26
See application file for complete search history.

(56) References Cited

U.S. PATENT DOCUMENTS 5,469,562 A * 11/1995 Saether ............... G06F 11/1474
714/E11.13
10,567,234 B1 2/2020 Todd
(Continued)

FOREIGN PATENT DOCUMENTS

CA 3208978 A1 7/2022
EP 3552343 B1 * 3/2022 ............... H04L 9/50
(Continued)

OTHER PUBLICATIONS

Bernabe, et al., "Privacy-Preserving Solutions for Blockchain: Review and Challenges," XP011757453, IEEE Access, vol. 7, Oct. 28, 2019, pp. 164908-164940.
(Continued)

*Primary Examiner* — Sakinah White-Taylor
(74) *Attorney, Agent, or Firm* — Bryan Santarelli; FisherBroyles, LLP

(57) ABSTRACT

A method for storing a persistent data structure a sequence of data blocks comprises receiving a new one of the data blocks for appending to a last one of the data blocks. Said new data block containing corresponding data and a corresponding appending requirement selected among a set of pre-defined appending requirements including a first appending requirement providing that a content and an ordering of all the data blocks match a corresponding first indication received with the appending requirement, and a further appending requirement providing that a content and an ordering of all the data blocks of a further sequence are at least an initial portion of the sequence matching a corresponding further indication received with the appending requirement, said further sequence identified by a corresponding context and appending said new data block to said last data block conditioned on a fulfillment of said corresponding appending requirement.

11 Claims, 9 Drawing Sheets

(56) References Cited

U.S. PATENT DOCUMENTS

| | | | | |
|---|---|---|---|---|
| 10,868,674 | B2 | 12/2020 | Beecham | |
| 10,880,105 | B1 | 12/2020 | Li | |
| 11,501,315 | B2 | 11/2022 | Novotny | |
| 11,791,980 | B1 | 10/2023 | Kaddoura | |
| 12,184,784 | B2 | 12/2024 | McIver | |
| 2018/0101844 | A1 | 4/2018 | Song | |
| 2018/0343111 | A1 | 11/2018 | Chen | |
| 2019/0079950 | A1 | 3/2019 | Ramabaja | |
| 2019/0104102 | A1 | 4/2019 | Khan | |
| 2019/0354443 | A1* | 11/2019 | Haustein | G06F 11/1448 |
| 2020/0175207 | A1 | 6/2020 | Cheng | |
| 2020/0192335 | A1 | 6/2020 | Takao | |
| 2020/0210386 | A1 | 7/2020 | Quick | |
| 2020/0250747 | A1 | 8/2020 | Padmanabhan | |
| 2020/0349123 | A1 | 11/2020 | Irazabal | |
| 2020/0374105 | A1 | 11/2020 | Padmanabhan | |
| 2020/0374301 | A1* | 11/2020 | Manevich | G06F 16/2379 |
| 2021/0258145 | A1 | 8/2021 | Sardesai | |
| 2021/0377037 | A1 | 12/2021 | Antonopoulos | |
| 2021/0406250 | A1 | 12/2021 | Novo Diaz | |
| 2022/0182375 | A1 | 6/2022 | Xu | |
| 2022/0358030 | A1 | 11/2022 | Yanamala | |
| 2023/0030421 | A1 | 2/2023 | Werner | |
| 2023/0046315 | A1 | 2/2023 | Davies | |
| 2023/0131232 | A1 | 4/2023 | Ratnakaram | |

FOREIGN PATENT DOCUMENTS

| | | | |
|---|---|---|---|
| EP | 3849133 | B1 | 7/2022 |
| WO | 2019228560 | A2 | 12/2019 |
| WO | 2020041127 | A1 | 2/2020 |
| WO | 2023232733 | A1 | 12/2023 |
| WO | 2023232734 | A1 | 12/2023 |
| WO | 2023232735 | A1 | 12/2023 |
| WO | 2023232738 | A1 | 12/2023 |
| WO | 2023232739 | A1 | 12/2023 |
| WO | 2023232740 | A1 | 12/2023 |

OTHER PUBLICATIONS

De Meijer, Carlo R.W., "Blockchain Versus GDPR and Who Should Adjust Most," XP055719852, Oct. 9, 2018, Retrieved from https://www.finextra.com/blogposting/16102/blockchain-versus-gdpr-and-who-should-adjust-most; PCT International Search Report & Written Opinion mailed Aug. 24, 2023, 11 pgs.

International Search Report & Written Opinion mailed Aug. 14, 2023 for Application No. PCT/EP2023/064315, a counterpart application of U.S. Appl. No. 18/869,397, 12 pgs.

International Search Report & Written Opinion mailed Aug. 16, 2023 for Application No. PCT/EP2023/064317, a counterpart application of U.S. Appl. No. 18/869,553, 11 pgs.

International Search Report & Written Opinion mailed Aug. 18, 2023 for Application No. PCT/EP2023/064314, a counterpart application of U.S. Appl. No. 18/869,383, 8 pgs.

International Search Report & Written Opinion mailed Sep. 20, 2023 for Application No. PCT/EP2023/064324, a counterpart application of U.S. Appl. No. 18/869,570, 9 pgs.

International Search Report & Written Opinion mailed Aug. 24, 2023 for Application No. PCT/EP2023/064316, a counterpart application of U.S. Appl. No. 18/869,548, 9 pgs.

International Search Report & Written Opinion mailed Aug. 25, 2023 for Application No. PCT/EP2023/064322, a counterpart application of U.S. Appl. No. 18/869,556, 10 pgs.

International Search Report & Written Opinion mailed Aug. 30, 2023 for Application No. PCT/EP2023/064323, a counterpart application of U.S. Appl. No. 18/869,562, 11 pgs.

Politou, et al., "Blockchain Mutability: Challenges and Proposed Solutions," XP081442719, Cornell University Library, arxiv. org, IEEE, Jul. 16, 2019, pp. 1-13.

Tanner, et al., "Technology Review of Blockchain Data Privacy Solutions," XP081957719, Cornell University Library, arxiv. org, IEEE, May 4, 2021, pp. 1-60.

Non-Final Office Action mailed Jan. 15, 2026 for U.S. Appl. No. 18/869,562, a corresponding application, 12 pgs.

Notice of Allowance mailed Jan. 16, 2026 for U.S. Appl. No. 18/869,570, a corresponding application, 14 pgs.

Non-Final Office Action mailed Mar. 16, 2026 for U.S. Appl. No. 18/869,548, a corresponding application, 12 pgs.

Non-Final Office Action mailed Apr. 22, 2026 for U.S. Appl. No. 18/869,556, a corresponding application, 6 pgs.

* cited by examiner

CONCURRENT WRITINGS IN VERIFIABLE PERSISTENT DATA STRUCTURES

CROSS-REFERENCE TO RELATED APPLICATIONS

This application is a national stage filing of international application No. PCT/EP2023/064317, entitled "IMPROVEMENT OF CONCURRENT WRITINGS IN VERIFIABLE PERSISTENT DATA STRUCTURES", filed May 29, 2023, which claims the benefit of priority from Italian patent application No. 102022000011342 filed May 30, 2022, both of which are incorporated herein by reference.

BACKGROUND OF THE PRESENT INVENTION

Field of the Present Invention

The present disclosure relates to the information technology field. More specifically, this disclosure relates to the storing of data.

Overview of the Related Art

Storing of data (e.g., logs, documents, transactions) is a commonplace activity in most computing systems (for example, for their preservation, outputting, further processing and so on).

For this reason, it is known to store data in suitable data structures, such as ledger-like data structures wherein the storing of data is persistent, i.e., data structures in which it should not be possible to remove the data therefrom once they have been stored.

Distributed ledger technology (DLT) is a technology used to maintain a distributed ledger, i.e., a replicated, shared, and synchronized collection of digital records spread across multiple computer nodes (also referred to as "participant nodes" or simply "nodes") typically located across multiple sites, countries, or institutions.

A conventional distributed ledger stores data into a sequence of data blocks in chronological order, linked to each other via corresponding hash values. Particularly, a generic data block of the sequence stores the hash value of the preceding block in the sequence.

The ledger is distributed throughout the participant nodes, which validate its content according to a consensus schema. In a consensus schema based on a proof of work, a complex mathematical problem has to be solved by determining a nonce to be added to each block that provides a specific property of its hash value.

Therefore, no data block may be altered without re-determining the nonces of this block and all the next data blocks in the ledger; however, the difficulty of the mathematical problem required to determine the nonces makes substantially impossible to alter the distributed ledger (unless a majority of the processing power of the whole network is acquired).

Distributed ledger technology has been initially designed to work with financial data, and the typical data block design is essentially a container for a list of small financial transactions.

More recently, distributed ledger technology is used in fields different than financial field (such as the internet of things, supply chains of various commodities, sharing of secure data, and logistic monitoring), and has great potential to revolutionize the way organizations operate in many industry verticals.

US 2020/374301 discloses one or more of receiving, by each of one or more peripheral peers of a blockchain network, a sequence of new blocks from an orderer peer, calculating hashes for the sequence of new blocks, adding the hashes to a merkle tree, determining the merkle tree is different than merkle trees from a majority of peripheral peers, determining that one or more blocks that correspond to the different merkle trees from the majority of peripheral peers are different from the sequence of new blocks, and in response ceasing committing blocks to the blockchain network.

US 2021/406250 discloses a method and a system for reducing the size of a blockchain. The blockchain includes a first set of two or more blocks including an initial genesis block. A new genesis block for the blockchain is generated. The first hash value resulting from hashing the new genesis block matches a second hash value resulting from hashing a last block from the first set of blocks, and the difficulty of determining the first hash value is computationally greater than the cumulative difficulty of determining hash values of all blocks in the first set of blocks. The new genesis block is transmitted to one or more blockchain nodes of a blockchain network, and the first set of blocks is replaced with the new genesis block.

US 2021/258145 discloses technologies for compressing a blockchain. In some examples, the technologies include removing selected blocks within a blockchain, and replacing the selected blocks with a summary block and a padding block. Each block of the selected blocks includes data in a certain state (such as data in an obsolete state). The technologies can include generating the summary block and padding blocks according to the data in the selected blocks and an original root hash included in the selected blocks and other blocks of the blockchain. The generating of the summary and padding blocks can include generating a new root hash in the summary and padding blocks that only replaces the original root hash in the summary and padding blocks. The generation of the new root hash can be based on a part of a header of a non-selected block of the blockchain directly linked to an end block of selected blocks.

SUMMARY OF THE PRESENT INVENTION

Applicant has found that the conventional distributed ledger solutions are affected by drawbacks.

More particularly, the strict requirements of conventional distributed ledgers—according to which a new data block can be appended to the sequence of data blocks only if it stores the hash value of the previous data block in the sequence-allows to prevent tampering with the history of the sequence of data blocks, but also causes throughput issues, especially in case a plurality of data blocks are concurrently available for being appended, each one storing the hash value of the last data block of the sequence of data blocks already stored in the ledger (this last data block of the sequence is also referred to as "head of the sequence", or simply "head"). Indeed, once one of these available data blocks is appended to the head (becoming thus the new head), the remaining available data blocks cannot be appended to the ledger, since now they are storing an hash value that is no more compatible with the new head, and have to be recomputed with the new hash value.

Applicant has therefore devised a solution for solving the abovementioned drawbacks.

One or more aspects of the present invention are set out in the independent claims, with advantageous features of the same invention that are indicated in the dependent claims, whose wording is enclosed herein verbatim by reference (with any advantageous feature being provided with reference to a specific aspect of the present that applies mutatis mutandis to any other aspect thereof).

In general terms, the solutions according to embodiments of the present invention are based on the idea of including in each new data block to be appended a corresponding appending requirement selected from a set of predefined different types of appending requirements, and performing the actual appending of a new data block conditioned to the fulfillment of the corresponding appending requirement.

Particularly, an aspect of the present invention relates to a method for storing a persistent data structure comprising a sequence of data blocks.

The method comprising, under the control of a computing system: at the computing system, receiving a new one of the data blocks to be appended to a last one of the data blocks in the sequence.

Said new data block contains corresponding data and a corresponding appending requirement selected among a set of pre-defined appending requirements.

Said set of pre-defined appending requirements comprises a first one of the appending requirements providing that a content and an ordering of all the data blocks of the sequence of data blocks match a corresponding first indication received with the appending requirement.

Said set of pre-defined appending requirements comprises a further one of the appending requirements providing that a content and an ordering of all the data blocks of a further sequence being at least an initial portion of the sequence matches a corresponding further indication received with the appending requirement, said further sequence being identified by a corresponding context.

The method further comprises at the computing system, appending said new data block to said last data block conditioned to a fulfillment of said appending requirement contained in the new data block.

By providing different types of appending requirements, it is advantageously possible to interact with the persistent data structure in a more flexible way, allowing to properly tailor new data blocks depending on the priority/type/application of the data to be included in a new data block to be appended.

The variety of the available different appending requirements that can be selected allows to manage new data blocks to be appended (each one providing for a respective appending requirements) with an improved flexibility, promoting throughput enhancement.

According to an embodiment of the present invention, each data block in the sequence is associated with a corresponding block hash being a hash value of said data block, and with a corresponding link hash being a hash value based on the block hash of said data block and on the link hash of a previous data block, in the sequence of data blocks, being adjacent to said data block.

According to an embodiment of the present invention, said first one of the appending requirements provides that the link hash of the last data block matches a link hash comprised in said first indication.

This appending requirement establishes a very strict requirement, providing that the whole history of the persistent data structure—i.e., the data content of all the data blocks of the sequence and the sequential order thereof-matches an expected history.

According to an embodiment of the present invention, said further one of the appending requirements provides that the link hash of a last data block of the current further sequence matches a link hash comprised in said further indication.

This appending requirement establishes a requirement for the appending of new data blocks that is potentially more flexible compared to the first appending requirement, since it may regard only the content and the sequential order (i.e., the history) of a portion of the whole persistent data structure, corresponding to the data blocks of the further sequence.

According to an embodiment of the present invention, said set of pre-defined appending requirements further comprises a still further one of the appending requirements providing that a content of the last data block matches a corresponding still further indication received with the appending requirement, and According to an embodiment of the present invention, said still further one of the appending requirements provides that the block hash of the last data block matches a block hash comprised in said still further indication.

This appending requirement establishes a less strict constraint, which is of the local type, in the sense that it regards only the content of a single (e.g., the last) data block of the persistent data structure, and not the history of the whole persistent data structure.

According to an embodiment of the present invention, said new data block further contains a context update request providing for an updating of the context to a new context indicative of an extension of the further sequence.

The update of the context strongly influences the appending of new data blocks associated with the further appending requirement, since for these new data blocks the corresponding third indication has to be compliant also with the (history of the) new data blocks that have been included in the extended further sequence following the update.

According to an embodiment of the present invention, the context identifying the further sequence corresponds to a lastly appended data block among data blocks of the sequence containing a corresponding context update request.

According to an embodiment of the present invention, the method further comprises storing an indication of the context at the computing system.

According to an embodiment of the present invention, said further sequence comprises all the data blocks of the sequence.

According to an embodiment of the present invention, the method further comprises, at the computing system:

- receiving a set of new ones of the data blocks to be appended;
- appending at least a selected one of the new ones of the data blocks of the received set to the last one of the data blocks in the sequence conditioned to the appending requirements contained in said received set of new ones of the data blocks.

In this way, an appending of concurrently received new data blocks can be performed in a way to advantageously avoid conflicts among the appending requirements of said new data blocks.

According to an embodiment of the present invention, said at least a selected one of the data blocks of the received set comprises a plurality of selected data blocks.

According to an embodiment of the present invention, the method further comprises appending the selected data blocks to the last one of the data blocks in the sequence by ordering the selected data blocks according to the appending requirements contained in the selected data blocks.

According to an embodiment of the present invention, said set of pre-defined appending requirements further comprises an additional one of the appending requirements that is always fulfilled.

Another aspect of the present invention relates to a computer program configured for causing a computing system to perform the method above when the computer program is executed on the computing system.

Another aspect of the present invention relates to a computer program product comprising one or more readable storage media having program instructions collectively stored on the readable storage media, the program instructions being readable by a computing system to cause the computing system to perform the method above.

Another aspect of the present invention relates to a computing system comprising means configured for performing the method above.

Another aspect of the present invention relates to a computing system comprising a circuitry for performing each step of the method above.

BRIEF DESCRIPTION OF THE DRAWINGS

These and other features and advantages of the present invention will appear more clearly by reading the following detailed description of exemplary and non-limitative embodiments thereof. For its better intelligibility, the following description should be read making reference to the attached drawing, wherein.

DETAILED DESCRIPTION OF EXEMPLARY AND NON-LIMITATIVE EMBODIMENTS OF THE PRESENT INVENTION

Figure 1:
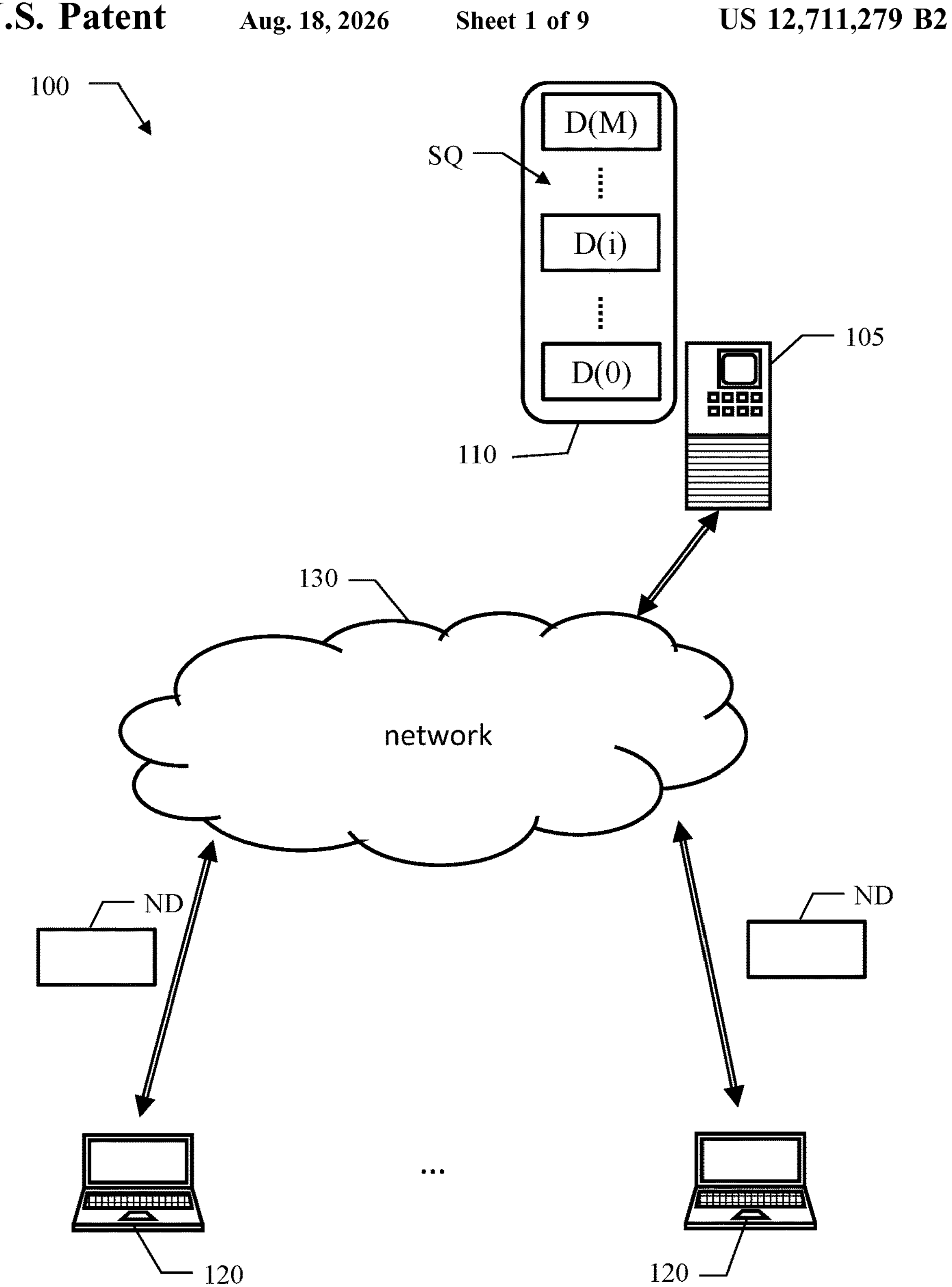
FIG. 1 is a schematic block diagram of an information technology infrastructure that may be used to implement the solution according to embodiments of the present invention.

With reference to the drawings, FIG. 1 is a schematic block diagram of an information technology infrastructure 100 that may be used to implement the solution according to embodiments of the present invention.

The infrastructure 100 comprises one or more storage computing systems, or simply storage nodes, 105 (only one illustrated in the figure) configured to store generic data (such as logs, documents, transactions, chats) into one or more data structures, or simply ledgers 110 (only one illustrated in the figure).

Each ledger 110 stores the corresponding data into data blocks D(i) (i=0, 1, . . . , M). The data blocks D(i) are arranged in a (chronological) sequence SQ defined by their appending to the ledger 110 (in the considered example, from data block D(0) to data block D(M)). The data blocks D(i) may only be added in succession by appending them to an end of the corresponding ledger 110. The ledger 110 accumulates the data that are never removed from the ledger 110 once they have been added therein (with any updates of the data that preserve all previous versions of the same data). In other words, the data are stored in each ledger 110 according to a persistence sequence SQ of data blocks D(i).

The infrastructure 100 further comprises one or more requesting computing systems, or simply requesting nodes, 120. The requesting nodes 120 are configured to send to the storage node(s) 105 new data blocks ND to be appended to the sequence SQ of data blocks D(i) of the ledger 110.

The storage node(s) 105, and the requesting nodes 120 communicate among them over a (telecommunication) network 130, such as for example the Internet.

Figure 2:
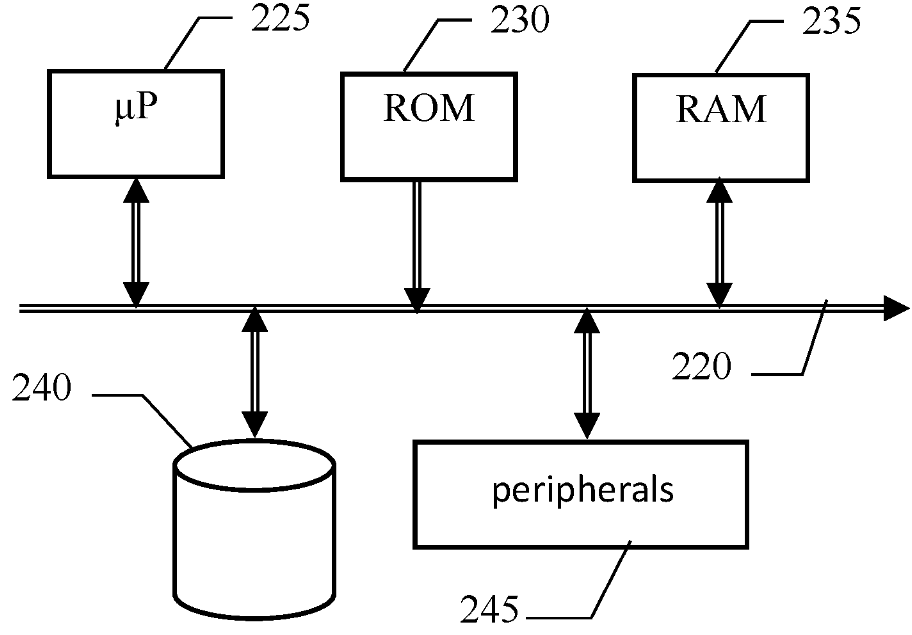
FIG. 2 shows an example of modules included in computing systems of the information technology infrastructure of FIG. 1.

Passing now to FIG. 2, each of the above-described computing systems (storage node(s) 105, requesting nodes 120) comprises several units that are connected among them through a bus structure 220 at one or more levels (with an architecture that is suitably scaled according to the type of the computing system 105, 120). Particularly, a microprocessor (μP) 225, or more, provides a logic capability of the computing system 105, 120, a non-volatile memory (ROM) 230 stores basic code for a bootstrap of the computing system 105, 120 and a volatile memory (RAM) 235 is used as a working memory by the microprocessor 225. The computing system 105, 120 is provided with a mass-memory 240 for storing programs and data (for example, storage devices of a data center wherein each computing system 105 is implemented and a Solid State Disk, or SSD, for each computing system 120). Moreover, the computing system 105, 120 comprises a number of controllers for peripherals, or Input/Output (I/O) units, 245; for example, the peripherals 245 of each computing system 105 comprise a network adapter for plugging the computing system 105 into a corresponding data center and then connecting it to a console of the data center for its control (for example, a personal computer, also provided with a drive for reading/writing removable storage units, such as of USB type) and to a switch/router sub-system of the data center for its communication with the network 130, whereas the peripherals 245 of each computing system 120 comprise a keyboard, a mouse, a monitor, a network adapter for connecting to the network 130 and a drive for reading/writing removable storage units (such as of USB type).

Figure 3A:
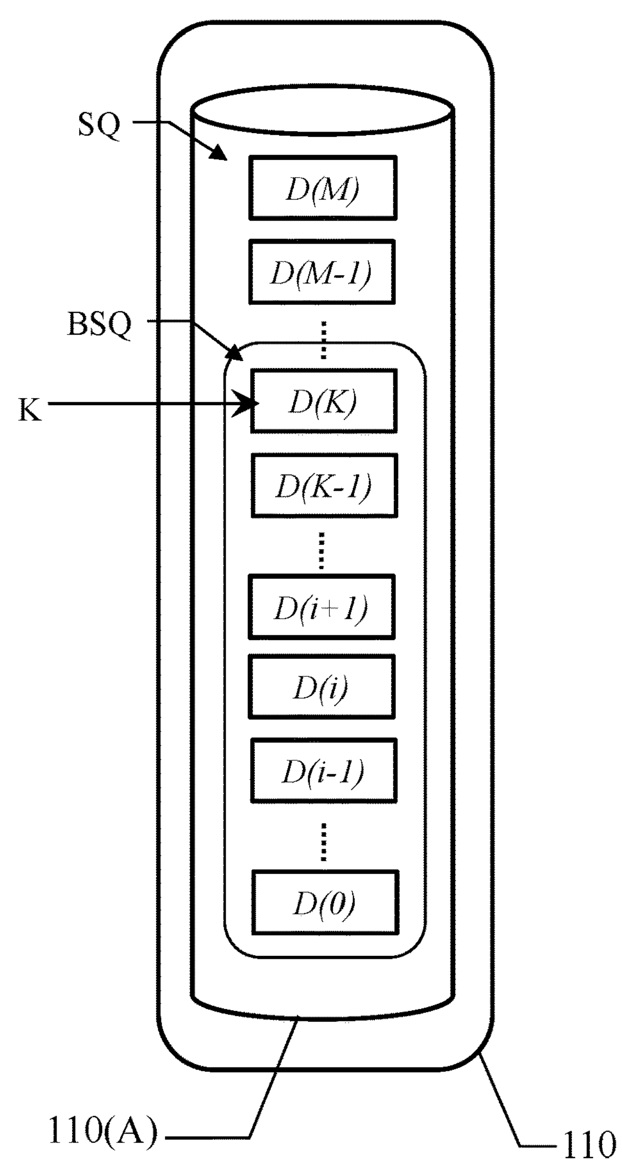
FIG. 3A shows a ledger according to an embodiment of the present invention.

By making reference to FIG. 3A, according to an embodiment of the present invention, the ledger 110 comprises a repository 110(A) ("data repository") configured to store the sequence SQ of data blocks D(i).

Figure 3B:
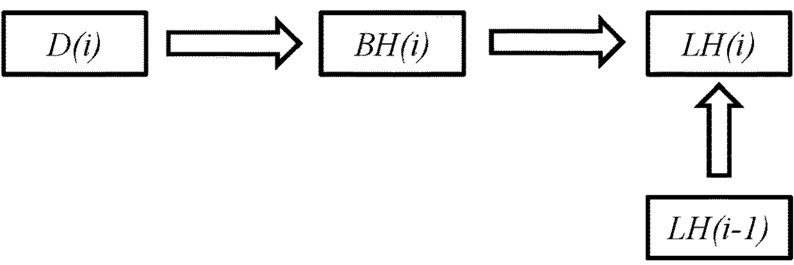
FIG. 3B illustrates how a link-hash of a data block of the ledger of FIG. 3A is generated according to an embodiment of the present invention.

By making reference to FIG. 3B, according to an embodiment of the present invention, a storage node 105 is configured to generate for each data block D(i) stored in the repository 110(A) a corresponding link-hash LH(i) providing history information indicative of a history of the ledger 110 up to said specific data block D(i). According to an embodiment of the present invention, a storage node 105 is configured to generate the link hash LH(i) of the data block D(i) in the following way.

The storage node 105 computes for the data block D(i) a corresponding block-hash BH(i) being a hash value of the data block D(i). Then, the storage node 105 computes the link-hash LH(i) as a hash value based on the block-hash of the data block D(i) (i.e., the block-hash BH(i)) and on the link hash of the previous (adjacent) data block D(i−1) in the sequence SQ (i.e., the link-hash LH(i−1)).

According to an embodiment of the present invention, the block-hashes BH(i) and the link hashes LH(i) are calculated through a cryptographic hash function. By cryptographic hash function it is herein intended a one-way function configured to output a hash value for which it is infeasible to reverse the process that generate the given hash value, it is infeasible to find two inputs with the same hash value, and for which a small change to the input should change the hash value to a large extent, so that the resulting changed hash value appears uncorrelated to the previous hash value.

For example, according to an embodiment of the present invention, the block-hashes BH(i) and the link hashes LH(i) are calculated using the SHA-256 or the SHA-512 cryptographic hash functions. However, the concepts of the present invention directly apply in case a different cryptographic hash function is employed.

According to an embodiment of the present invention (not illustrated), the link hashes LH(i) may be advantageously stored at the storage node 105 so as to be already available instead of having to re-calculate them when required.

According to an embodiment of the present invention, a further sequence BSQ of the data blocks D(i) (also referred to as "backbone sequence") being at least an initial portion of the sequence SQ of data blocks D(i) is identified by a corresponding context K.

According to an embodiment of the present invention, the backbone sequence BSQ is the sequence comprising the data blocks D(i) (i=0 to K) of the sequence SQ. In other words, according to an embodiment of the present invention, the context K provides an indication of the last data block D(K) of the backbone sequence BSQ, i.e., the most recently appended data block D(i) of the sequence SQ that is also part of the backbone sequence BSQ. For example, the context K may be identified by a value corresponding to the index i=K of the last data block D(i=K) of the backbone sequence BSQ.

Based on the context K, the backbone sequence BSQ may correspond to the entire sequence SQ (if K=M), or only to a portion thereof (if K<M).

As will be described in greater details in the following of the description, an indication of the context K can be stored at the storage node 105, for example in a dedicated repository, or the context K can be directly obtained from the content of the data blocks D(i) stored in the ledger 110.

According to an embodiment of the present invention, each new data block ND sent by a requesting node 120 (see FIG. 1) to the storage node 105 for being appended to the sequence SQ of data blocks D(i) of the ledger 110 comprises—in addition to the actual data (i.e., the payload)—a corresponding appending requirement, and the storage node 105 is configured to append said new data block ND to the ledger 110 only if the ledger 110 fulfills said appending requirement.

According to an embodiment of the present invention, each appending requirement contained in a new data block ND is selected among a set of pre-defined appending requirements AR(j). According to an embodiment of the present invention, some of said pre-defined appending requirements AR(j) are also accompanied by a corresponding indication parameter INI) contained as well in said new data block ND.

A first appending requirement AR(1) according to an embodiment of the present invention provides that a content and an ordering of all the data blocks D(i) (i=0 to M) of the sequence SQ of the ledger 110 match the indication parameter IND contained in the received new data block ND.

For this purpose, according to an embodiment of the present invention, the first appending requirement AR(1) provides that the link hash LH(M) of the last data block D(M) of the sequence SQ of the ledger 110 matches a link hash comprised in the received indication parameter IND. Since the link hash LH(i) corresponding to a generic data block D(i) depends both on the content of the data block D(i) itself (through the block hash BH(i)) and on the link hash LH(i−1) of the previous data block D(i−1) in the sequence, requiring that the link hash LH(M) of the last data block D(M) of the sequence SQ of the ledger 110 matches a specific link hash value implies in turn requiring that the history of the ledger 110—i.e., the data content of all the data blocks of the sequence SQ and the sequential order thereof—matches an expected history.

Figure 4A:
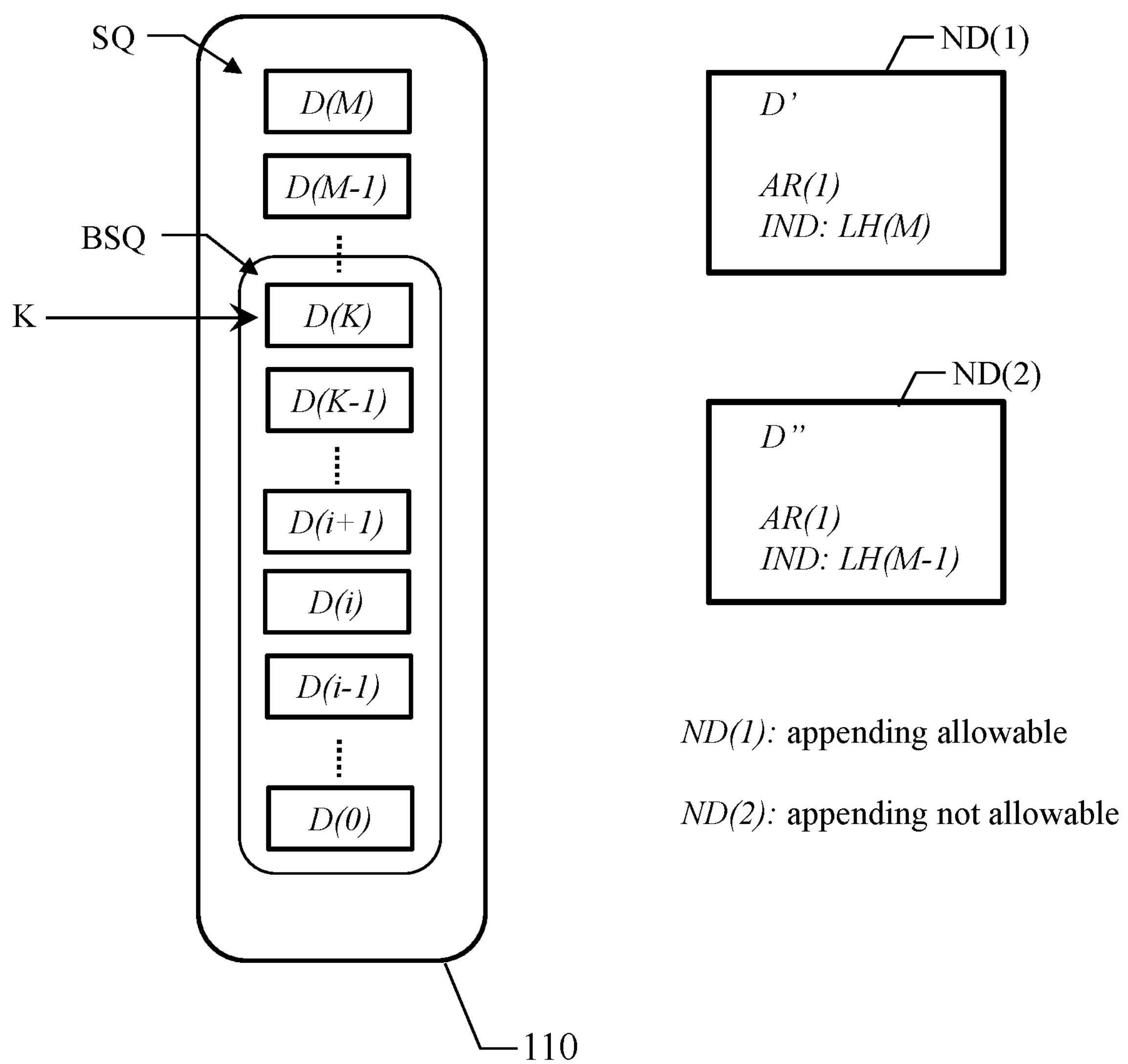
FIGS. 4A-4D shows exemplary data blocks containing appending requirements according to embodiments of the present invention.

FIG. 4A illustrates an exemplary scenario in which the current context K is lower than M, so that the backbone sequence BSQ corresponds to only a portion of the entire sequence SQ, and two exemplary new data blocks ND(1) and ND(2) are received each one containing a respective first appending requirement AR(1) according to an embodiment of the present invention.

The new data block ND(1) comprises corresponding data D', and the corresponding first appending requirement AR(1) is associated to an indication parameter IND comprising the link-hash LH(M). This means that the requesting node 120 which sent the new data block ND(1) requested that a new data block comprising data D' has to be appended to the ledger only if the current last data block of the ledger 110 is the specific data block identified by the link hash LH(M) comprised in the indication parameter IND.

The new data block ND(2) comprises corresponding data D", and the corresponding first appending requirement AR(1) is associated to an indication parameter IND comprising the link-hash LH(M−1). This means that the requesting node 120 which sent the new data block ND(2) requested that a new data block comprising data D" has to be appended to the ledger only if the current last data block of the ledger 110 is the specific data block identified by the link hash LH(M−1) comprised in the indication parameter IND.

Since the first appending requirement AR(1) comprised in the received new data block ND(1) is fulfilled, while the first appending requirement AR(1) comprised in the received new data block ND(2) is not fulfilled, the storage node 105 will:

- assess that the appending of the new data block ND(1) is allowable, and
- assess that the appending of the new data block ND(2) is not allowable.

For example, according to an exemplary embodiment of the invention, a new data block D(M+1) corresponding (e.g., equal) to the received new data block ND(1) can be appended to the last data block D(M) of the sequence SQ.

The first appending requirement AR(1) establishes a strict requirement for the appending of new data blocks, that is comparable to the requirement for the appending of new data blocks of conventional blockchains.

Examples of data D included in new data blocks ND containing the first appending requirement AR(1) may comprise information that make reference to a precise insertion point in the ledger 110 and a specific history of the whole ledger 110. For example, data D may relate to a declaration of acceptance of a contract regarding all the data blocks D(i) of the ledger 110, or a validation assessment regarding all the data blocks D(i) of the ledger 110.

It is pointed out that the first appending requirement AR(1) regards the status of the entire sequence SQ, and is unrelated to the context K.

A second appending requirement AR(2) according to an embodiment of the present invention provides that a content of the last data block D(M) of the sequence SQ of the ledger 110 matches the indication parameter INI) contained in the received new data block ND.

For this purpose, according to an embodiment of the present invention, the second appending requirement AR(2) provides that the block hash BH(M) of the last data block D(M) of the sequence SQ of the ledger 110 matches a block hash comprised in the received indication parameter IND. Compared to the first appending requirement AR(1), which involves all the data blocks D(i) of the ledger 110, and therefore is a requirement on the overall history of the ledger 110, the second appending requirement AR(2) relates only to the content of the last data block D(M) of the sequence SQ, since the block hash BH(i) of a generic data block D(i) of the sequence SQ is not related to, and does not depend on, the previous data blocks D(0), D(1), . . . , D(i−1) of the sequence SQ.

Figure 4B:
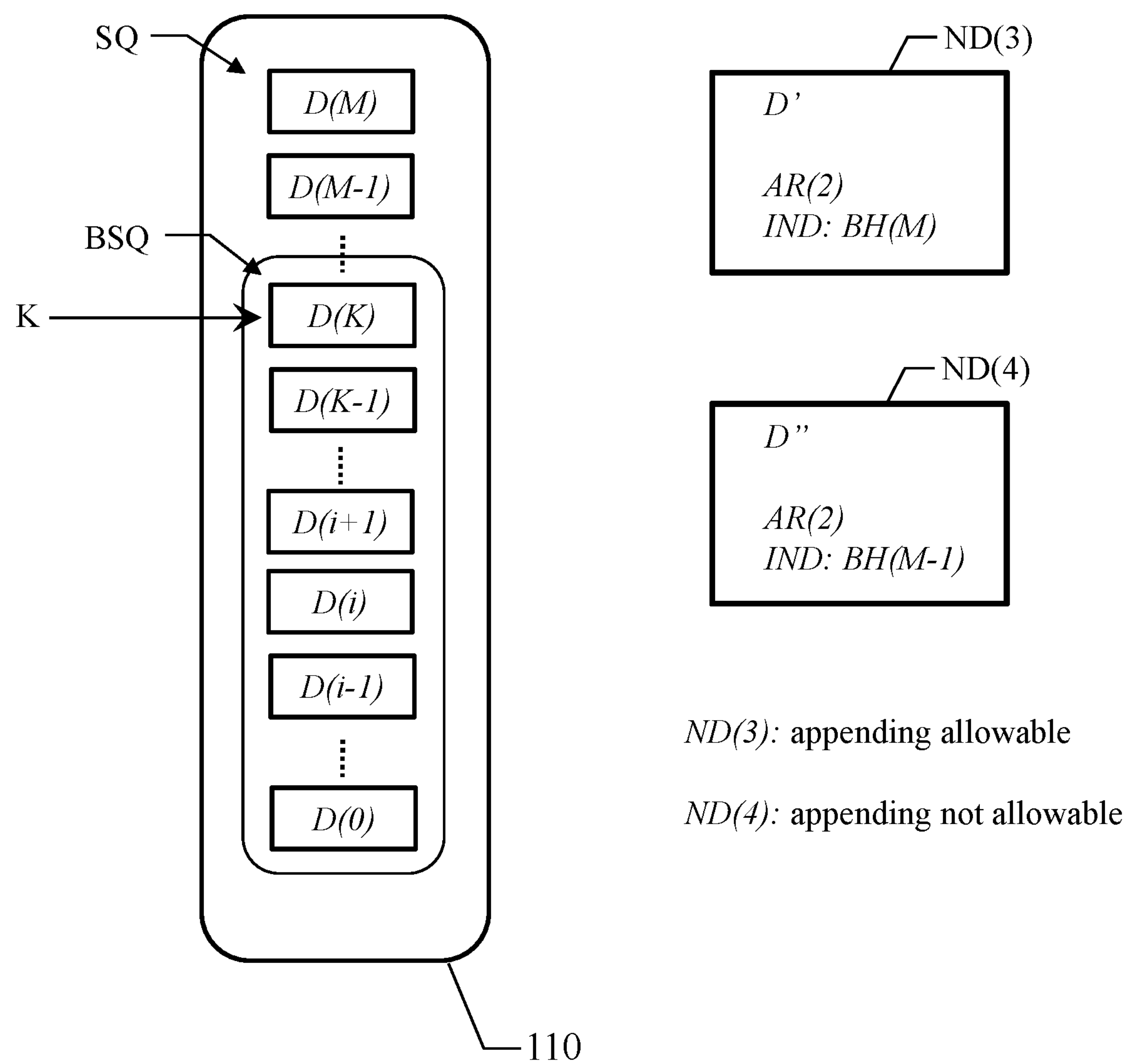

FIG. 4B illustrates an exemplary scenario in which the current context K currently stored at the storage node 105 is lower than M, so that the backbone sequence BSQ corresponds to only a portion of the entire sequence SQ, and two exemplary new data blocks ND(3), ND(4) are received each one containing a respective second appending requirement AR(2) according to an embodiment of the present invention.

The new data block ND(3) comprises corresponding data D', and the corresponding second appending requirement AR(2) is associated to an indication parameter IND comprising the block-hash BH(M). This means that the requesting node 120 which sent the new data block ND(3) requested that a new data block comprising data D' has to be appended to the ledger only if the current last data block of the ledger 110 comprises data such that the block-hash of such current last data block corresponds to the block hash BH(M) comprised in the indication parameter IND.

The new data block ND(4) comprises corresponding data D", and the corresponding second appending requirement AR(2) is associated to an indication parameter IND comprising the block-hash BH(M−1). This means that the requesting node 120 which sent the new data block ND(4) requested that a new data block comprising data D" has to be appended to the ledger only if the current last data block of the ledger 110 comprises data such that the block-hash of such current last data block corresponds to the block hash BH(M−1) comprised in the indication parameter IND.

Since the second appending requirement AR(2) comprised in the received new data block ND(3) is fulfilled, while the second appending requirement AR(2) comprised in the received new data block ND(4) is not fulfilled, the storage node 105 will:

- assess that the appending of the new data block ND(3) is allowable, and
- assess that the appending of the new data block ND(4) is not allowable.

For example, according to an exemplary embodiment of the invention, a new data block D(M+1) corresponding (e.g., equal) to the received new data block ND(3) can be appended to the last data block D(M) of the sequence SQ.

The second appending requirement AR(2) establishes a less strict requirement for the appending of new data blocks compared to the previously described first appending requirement AR(1).

The second appending requirement AR(2) is a local requirement, in the sense that it regards only the content of a single data block, and not the history of the whole ledger 110. It is worth noticing that this local requirement is fulfilled any time the last data block of the sequence SQ has a content matching the block hash comprised in the indication parameter IND.

Examples of data D included in new data blocks ND comprising the second appending requirement AR(2) may comprise information that is only related to the content of a single data block, such as an attachment of a document included in the previous data block or a digital sign regarding the previous data block.

It is pointed out that the second appending requirement AR(2) only regards the status of the last data block of the sequence SQ, and is unrelated to the context K.

A third appending requirement AR(3) according to an embodiment of the present invention provides that a content and an ordering of all the data blocks D(i) (i=0 to K) of the backbone sequence BSQ of the ledger 110 match the indication parameter IND contained in the received new data block ND.

For this purpose, according to an embodiment of the present invention, the third appending requirement AR(3) provides that the link hash LH(K) of the last data block D(K) of the backbone sequence BSQ (i.e., the data block identified by the current context K) matches a link hash comprised in the received indication parameter IND. Therefore, the third appending requirement AR(3) implies requiring that the history of the portion of the ledger 110 corresponding to the backbone sequence BSQ—i.e., the data content of all the data blocks of the backbone sequence BSQ and the sequential order thereof—matches an expected history.

Figure 4C:
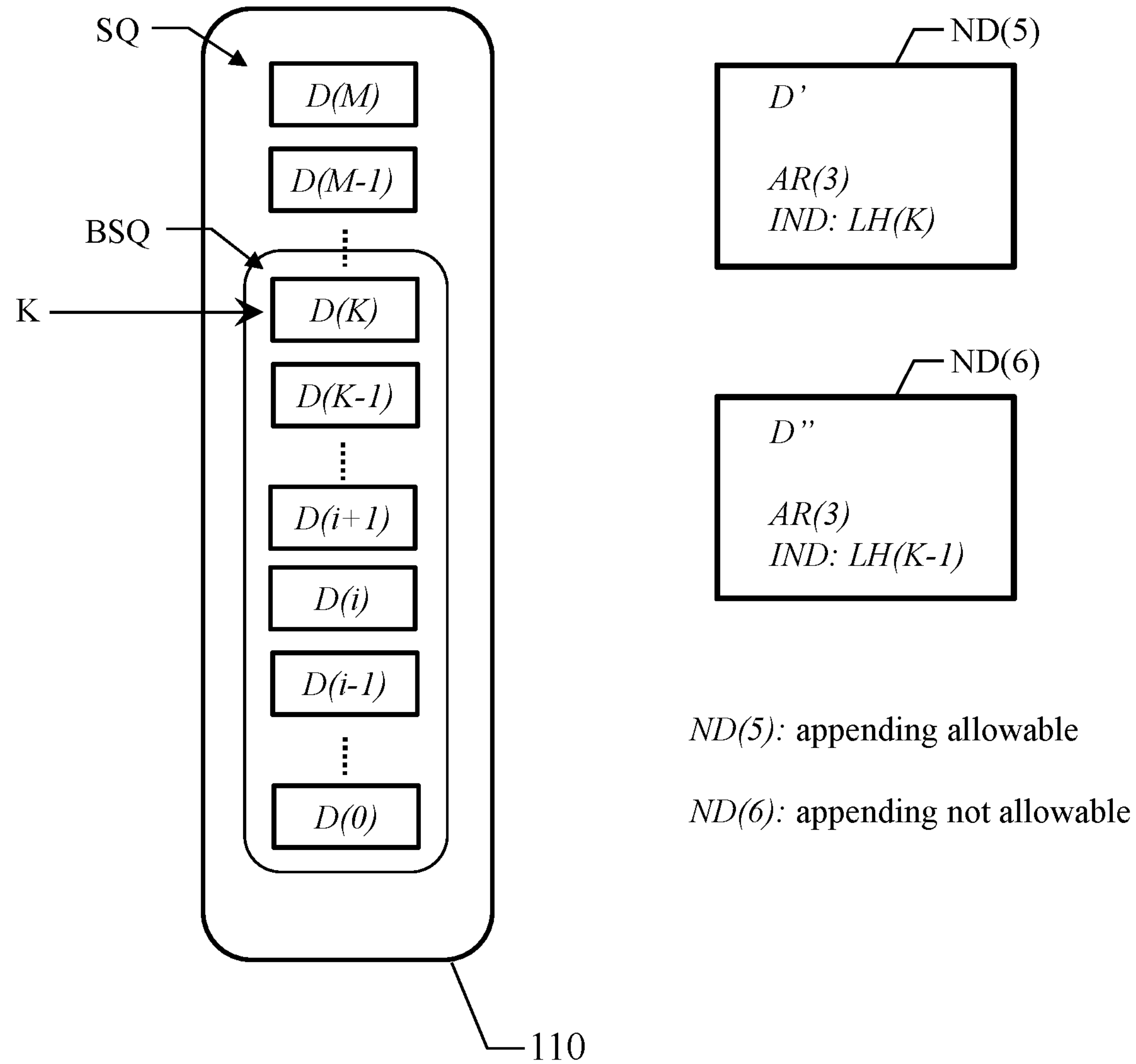

FIG. 4C illustrates an exemplary scenario in which the current context K currently stored at the storage node 105 is lower than M, so that the backbone sequence BSQ corresponds to only a portion of the entire sequence SQ, and two exemplary new data blocks ND(5) and ND(6) are received each one containing a respective third appending requirement AR(3) according to an embodiment of the present invention.

The new data block ND(5) comprises corresponding data D', and the corresponding third appending requirement AR(3) is associated to an indication parameter IND comprising the link-hash LH(K). This means that the requesting node 120 which sent the new data block ND(5) requested that a new data block comprising data D' has to be appended to the ledger only if the current last data block of the backbone sequence BSQ of the ledger 110 is the specific data block identified by the link hash LH(K) comprised in the indication parameter IND.

The new data block ND(6) comprises corresponding data D", and the corresponding third appending requirement AR(3) is associated to an indication parameter IND comprising the link-hash LH(K−1). This means that the requesting node 120 which sent the new data block ND(6) requested that a new data block comprising data D" has to be appended to the ledger only if the current last data block of the backbone sequence BSQ of the ledger 110 is the specific data block identified by the link hash LH(K−1) comprised in the indication parameter IND.

Since the third appending requirement AR(3) comprised in the new data block ND(5) is fulfilled, while the third appending requirement AR(3) comprised in the new data block ND(6) is not fulfilled, the storage node 105 will:

- assess that the appending of the new data block ND(5) is allowable, and assess that the appending of the new data block ND(6) is not allowable.

For example, according to an exemplary embodiment of the invention, a new data block D(M+1) corresponding (e.g., equal) to the received new data block ND(5) can be appended to the last data block D(M) of the sequence SQ.

The third appending requirement AR(3) establishes a requirement for the appending of new data blocks that is potentially more flexible compared to the first appending requirement AR(1), since it regards only the content and the sequential order of the portion of the ledger 110 corresponding to the backbone sequence BSQ. This means that when the current context K is lower than M, so that the backbone sequence BSQ corresponds to only a portion of the entire sequence SQ comprising the data blocks D(i) (i=0 to K<M), the appending of new data blocks ND containing the third appending requirement AR(3) may be allowed irrespective of the content (and irrespective of the order) of the data blocks D(i) (i=K+1 to M) of the sequence SQ that are not included in the backbone sequence BSQ. In other words, from the point of view of new data blocks ND containing the third appending requirement AR(3), the relevant data blocks are only the data blocks D(i) (i=0 to K) corresponding to the backbone sequence BSQ.

Examples of data D included in new data blocks ND comprising the third appending requirement AR(3) may comprise information that make reference to a specific history of the portion of the ledger 110 corresponding to the backbone sequence BSQ. For example, data D may relate to a declaration of acceptance of a contract regarding only the data blocks D(i) (i=0 to K) of the backbone sequence BSQ (i.e., that is unrelated to the content or order of the other data blocks D(i) (i=K+1 to M). The third appending requirement AR(3) may be also expediently used together with the previously described second appending requirement AR(2) to implement a so-called atomic transaction divided into a plurality of data blocks chained to each other that need to be appended in a predetermined order. In this case, a first new data block ND containing a third appending requirement AR(3) may be followed by one or more new data blocks ND containing a second appending requirement AR(2) comprising indication parameters IND corresponding to the data content of the first new data block ND.

A fourth appending requirement AR(4) according to an embodiment of the present invention provides that a new data block ND containing said appending requirement AR(4) can be appended to the ledger 110 irrespective of the content of any data block D(i) (i=0 to M) of the sequence SQ of the ledger 110 or of the order of the data blocks of the ledger 110. In other words, the fourth appending requirement AR(4) is a requirement that is always fulfilled.

Figure 4D:
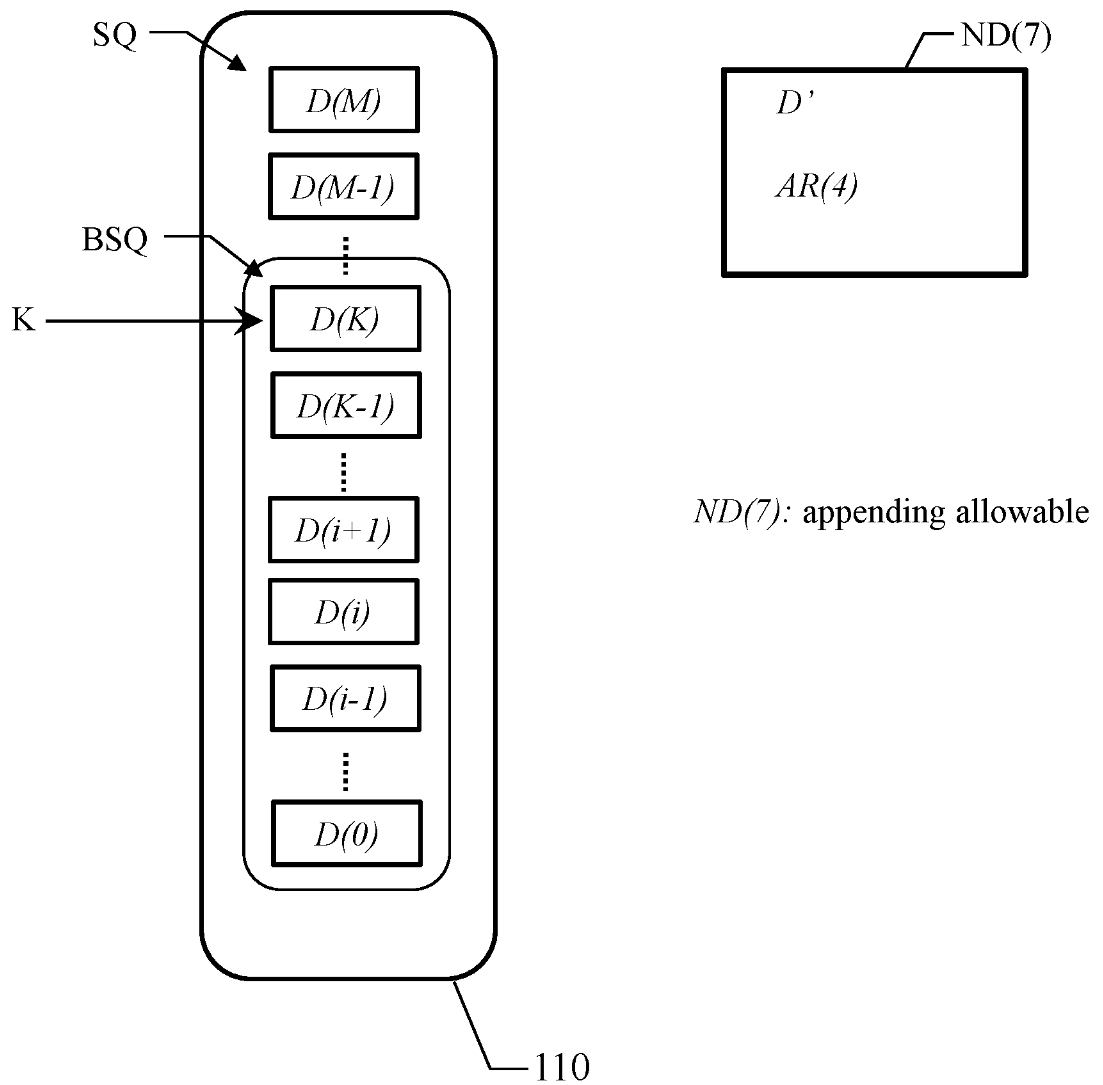

FIG. 4D illustrates an exemplary scenario in which the current context K currently stored at the storage node 105 is lower than M, so that the backbone sequence BSQ corresponds to only a portion of the entire sequence SQ, and an exemplary new data block ND(7) is received containing a respective fourth appending requirement AR(4).

The new data block ND(7) comprises corresponding data D'. This means that the requesting node 120 which sent the new data block ND(7) requested that a new data block comprising data D' has to be appended to the ledger 110, without specifying any other particular requirement.

Since the fourth appending requirement AR(4) of the new data block ND(7) is automatically fulfilled, the storage node 105 will assess that the appending of the new data block ND(7) is allowable.

For example, according to an exemplary embodiment of the invention, a new data block D(M+1) corresponding (e.g., equal) to the received new data block ND(7) can be appended to the last data block D(M) of the sequence SQ.

Examples of data D included in new data blocks ND containing the fourth appending requirement AR(4) may comprise information that is independent from the content of the other data blocks of the ledger 110 and from the order thereof, i.e., information that do not have a relationship with the information of the other data blocks (e.g., information that is always valid, such as "1 meter equals 39.37 inches"), or may comprise information that self contains the means required for identifying a relationship with other data blocks of the ledger 110 (e.g., an information specifying the accepting of a contract loaded in a specific and explicitly identified data block already stored in the ledger 110).

By providing different types of appending requirements according to the embodiments of the invention previously described, it is advantageously possible to interact with the ledger 110 in a more flexible way, with the requesting nodes 120 that are allowed to properly tailor the sending of new data blocks ND depending on the priority/type/application of the data to be included in a new data block to be appended and/or depending on the application policy supported by the ledger 110.

The variety of the available different appending requirements that can be selected by a requesting node 120 according to the embodiments of the invention allows the storage node 105 to concurrently manage a plurality of received new data blocks ND to be appended (each one providing for a respective appending requirement) with an improved flexibility, promoting throughput enhancement.

According to an embodiment of the present invention, a new data block ND may further comprise a context update request UP to update the backbone sequence BSQ, so as to extend the backbone sequence BSQ with the inclusion of further data blocks D(i) of the ledger 110.

According to an embodiment of the present invention, the (current) context K of the ledger 110 corresponds to the lastly appended data block among the data blocks D(i) of the ledger 110 comprising a context update request UP. In this way, once a data block D(M+1) corresponding to a received new data block ND comprising a context update request UP is appended to the last data block D(M) of the sequence SQ, the context K is updated to correspond to the current last data block D(M+1), so that the backbone sequence BSQ is updated to correspond to the current whole sequence SQ.

According to another embodiment of the present invention, the context update request UP may instead explicitly specify the (new) last data block D(K) of the (updated) backbone sequence BSQ, such as for example by specifying a new value of the context K identifying said (new) last data block D(K). According to an embodiment of the present invention, the new value of the context K may be such that the updated backbone sequence BSQ coincides with the entire sequence SQ of data blocks D(i), or may be such that the updated backbone sequence BSQ is still a portion of the entire sequence SQ.

A context update request UP may be sent every time a new version of a contract is stored in the ledger 110.

The update of the backbone sequence BSQ strongly influences subsequently received new data blocks ND providing for the third appending requirement AR(3). Indeed, the updating of the backbone sequence BSQ implies that the appending of subsequently received new data blocks ND providing for the third appending requirement AR(3) will be considered allowable only if the indication parameter IND matches the new, updated, context K. In other words, in order to be considered allowable by the storage node 105, a new data block ND providing for the third appending requirement AR(3) received after the updating of the backbone sequence BSQ has to be compliant also with the (content and history of the) new data blocks D(i) that have been included in the backbone sequence BSQ with the updating.

Figure 5:
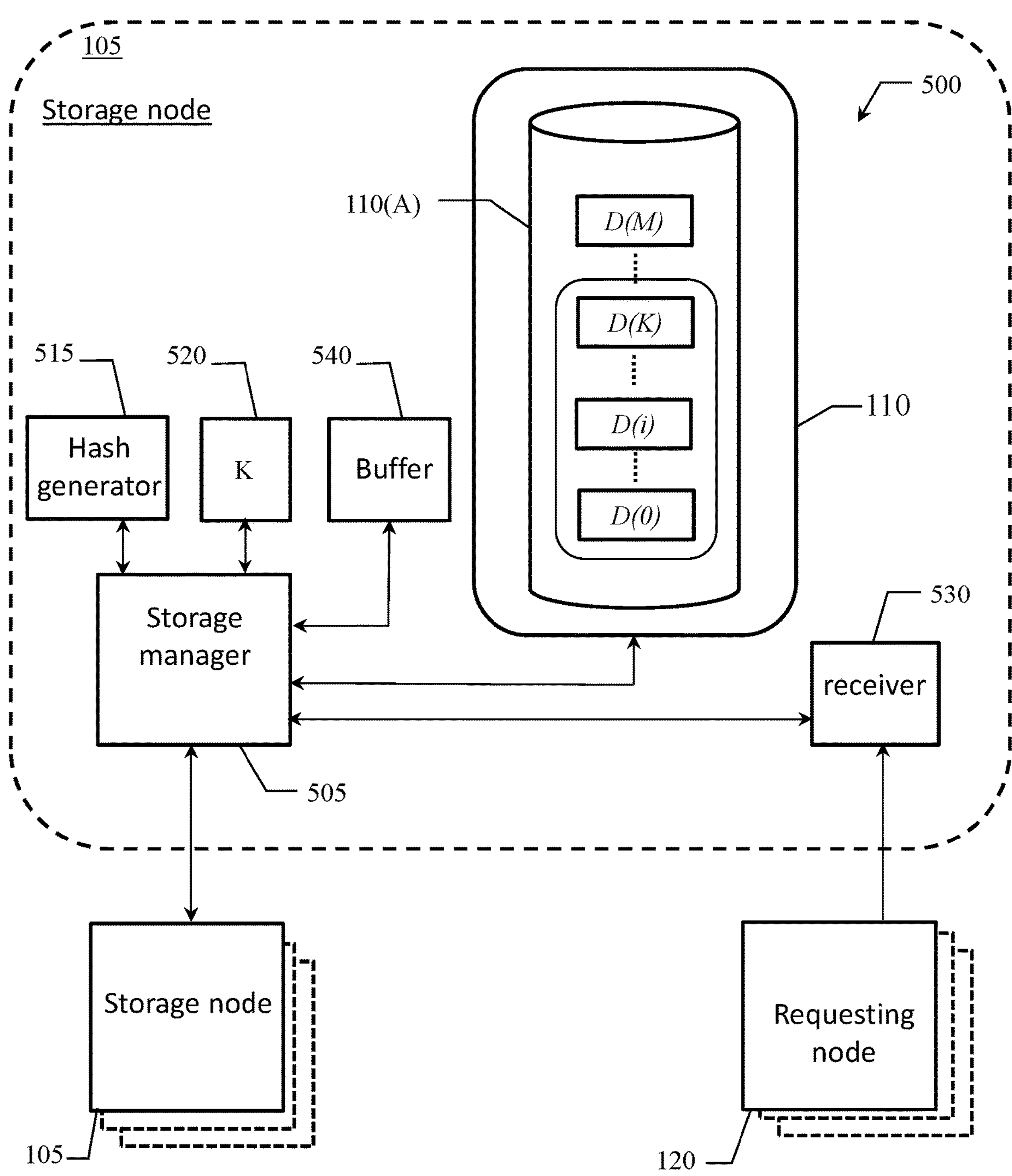
FIG. 5 shows main software components that may be used by storage nodes of the information technology infrastructure of FIG. 1 according to embodiments of the present invention.

With reference now to FIG. 5, main software components are shown that may be used by each storage node 105 to implement the solution according to an embodiment of the present disclosure.

Particularly, all the software components (programs and data) are denoted as a whole with the reference 500. The software components are typically stored in the mass memory and loaded (at least partially) into the working memory of the storage node 105 when the programs are running, together with an operating system and other application programs not directly relevant to the solution of the present disclosure (thus omitted in the figure for the sake of simplicity). The programs are initially installed into the mass memory, for example, from removable storage units or from the network. In this respect, each program may be a module, segment or portion of code, which comprises one or more executable instructions for implementing the specified logical function.

The software components 500 comprise a storage manager 505 configured to manage the storing of data in ledgers 110 (only one illustrated in FIG. 5) under the control of the storage node 105. The storage manager 505 is configured to read/write—under the control of the storage node 105—the data repository 110(A) (see FIG. 1).

A hash generator 515 is configured to interact with the storage manager 505 for calculating the block hashes BH(i) and the link hashes LH(i) of the data blocks D(i) of the ledger 110.

According to an embodiment of the present invention, the software components 500 further comprise a context repository 520 configured to store the an indication of the context K indicative of the data blocks D(i) (i=0 to K) of the ledger 110 forming the backbone sequence BSQ.

According to another embodiment of the invention, the context repository 520 is not provided, and the storage manager 505 is configured to assess a current context K of the ledger 110 by directly inspecting the data repository 110(A) to identify the last stored data block D(i) containing a context update request UP.

The software components 500 further comprise receiver module 530 configured to receive the new data blocks ND from the requesting nodes 120 and forward them to the storage manager 505 in order to be processed for causing possible appending of new data blocks D(i) to the ledger 110.

According to an embodiment of the present invention, the software components 500 further comprises a buffer module 540 configured to temporarily store received new data blocks ND to allow a concurrent appending of data blocks corresponding to a set of new data blocks ND that can be also include more than one new data block ND.

Figure 6:
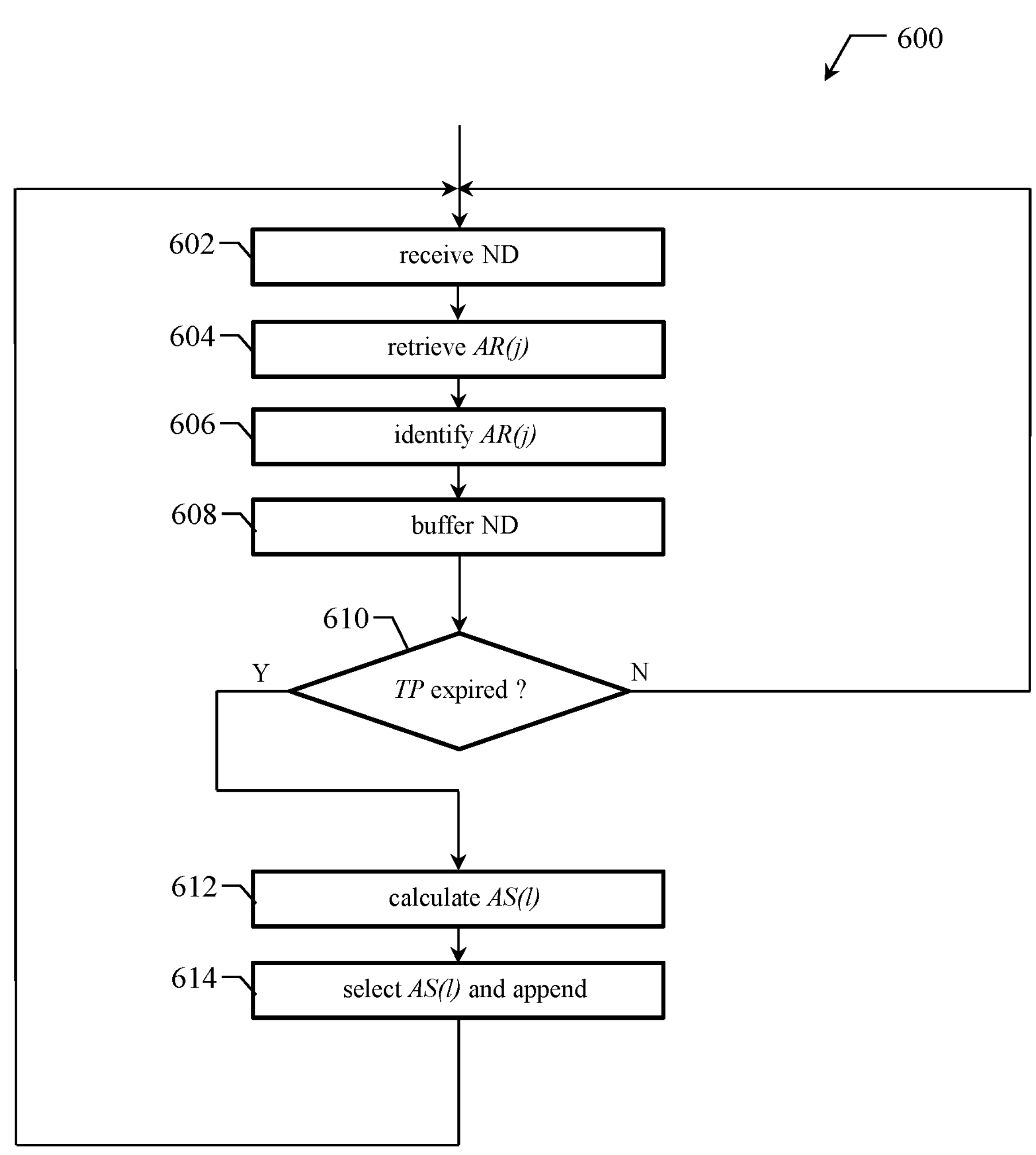
FIG. 6 illustrates a flow chart describing an example of operations for managing the appending of new data blocks according to embodiments of the present invention.

With reference to FIG. 6, a flow chart 600 is shown describing an example of the operations carried out by the software components 500 of a storage node 105 for managing the reception of new data blocks ND sent by requesting nodes 120 according to an embodiment of the present invention.

The flow of operations starts when the receiver module 530 of the storage node 105 receives a new data block ND sent by a requesting node 120 (block 602). As already described above, the new data block ND comprises data D (i.e., the payload) and contains a corresponding appending requirement AR(j) and a possible corresponding indication parameter IND. Moreover, the new data block ND may also contain a context update request UP.

The received new data block ND is then provided to the storage manager 505 for being processed.

According to an embodiment of the present invention, the storage manager 505 retrieves the appending requirement AR(j) contained in the received new data block ND, and (if present) the corresponding indication parameter IND (block 604). Moreover, if present in the received new data block ND, the storage manager 505 may also retrieve a context update request UP.

According to an embodiment of the present invention, the storage manager 505 identifies which appending requirement AR(j), among the set of predetermined appending requirements AR(j), the retrieved appending requirement AR(j) corresponds to (block 606).

According to an embodiment of the present invention, instead of immediately assessing if the retrieved appending requirement AR(j) is fulfilled and directly appending a new data block corresponding to the received new data block ND—if the retrieved appending requirement AR(j) is fulfilled—the storage manager 505 temporarily stores the received new data block ND in the buffer module 540 (block 608), and wait for a predetermined period of time TP in order to be able of receiving possible further new data blocks ND from the requesting nodes 120.

For this purpose, according to an embodiment of the present invention, if a further new data block ND is received before the expiration of the predetermined period of time TP (exit branch N of block 610, return to block 602), said further new data block ND is processed by the storage manager 505 as previously described, by retrieving (block 604) and identifying (block 606) the appending requirement AR(j) contained therein (together with a possible indication parameter IND and a possible context update request UP). Then, also said further new data block ND is temporarily stored in the buffer module 540 (block 608).

According to an embodiment of the present invention, when the predetermined period of time TP is expired (exit branch Y of block 610), the storage manager 505 accesses the buffer nodule 540 for retrieving the set of new data blocks ND stored therein, and then calculates (block 612) one or more appending solutions AS(l) involving at least a subset of the new data blocks ND of the set. Each appending solution AS(l) provides for the selection of one or more of the new data blocks ND of the set to be appended to the ledger 110 according to a corresponding order for which all the appending requirement(s) AR(j) of the selected new data block(s) ND are fulfilled. Appending solutions AS(l) which do not provide for any new data block ND selection are contemplated if no appending requirement AR(j) can be fulfilled.

According to an embodiment of the present invention, the storage manager 505 selects one of the calculated appending solutions AS(l) and then actually append the selected new data block(s) ND to the last data block D(M) of the sequence SQ of the ledger 110 following the corresponding order provided by the selected appending solution AS(l) (block 614). According to an embodiment of the present invention, the selected new data block(s) ND that have been appended are then removed from the buffer nodule 540.

Without entering into specific details that are outside the scope of the present disclosure, according to an embodiment of the present invention, the choice of which appending solution AS(l) is selected among the various calculated appending solutions AS(l) is carried out so as to promote throughput enhancement by maximizing the number of new data blocks ND to be appended with respect to the total number of new data blocks ND accumulated in the buffer module 540 (i.e., preferring appending solutions AS(l) corresponding to less conflicts). According to an embodiment of the present invention, the selection of the appending solution AS(l) may be also influenced by the policy of the ledger 110.

According to an embodiment of the present invention, if the selected new data block(s) ND of the selected appending solution AS(l) do not comprise all the new data block ND that were stored in the buffer module 540, the remaining new data blocks ND are still kept in the buffer nodule 540, for being considered for the generation of possible other appending solutions AS(l), possibly together with new data blocks ND received by the requesting nodes 120 during following reiterations of the procedure.

According to an embodiment of the present invention, the remaining new data blocks ND that have not been appended are removed from the buffer module 540, for example after the expiration of a corresponding time period.

It is pointed out that if the selected appending solution AS(l) provided for the appending of one or more new data blocks ND containing a context update request UP, the appending of said one or more new data blocks ND causes a corresponding updating of the context K.

The flow of operations herein described is then reiterated for the reception of new data blocks ND (return to block 602).

It is pointed out that thanks to the presence of a plurality of different appending requirements AR(j), the number of possible appending solution AS(l) that can be generated is advantageously large, allowing to perform an improved selection of the appending solution AS(l) to be actually implemented, increasing the throughput of the ledger 110 thanks to an improved flexibility in managing the appending of concurrently received new data blocks ND.

In the following, some not limitative examples for the management of appending solution AS(l) are provided according to some embodiments of the invention.

Since the third appending requirement AR(3) may be fulfilled irrespective of the content and order of the data blocks D(i) (i=K+1 to M) of the sequence SQ that are not included in the backbone sequence BSQ, the selection of an appending solution AS(l) providing for appending a new data block ND containing the third appending requirement AR(3) may be postponed to a later time (allowing thus the appending of different new data blocks ND) as long as the context K (and therefore the backbone sequence BSQ) is not modified.

Moreover, specific appending solutions AS(l) may be generated to serve atomic transactions comprising a first new data block ND containing a third appending requirement AR(3) be followed by one or more new data blocks ND containing a second appending requirement AR(2) comprising indication parameters IND corresponding to the data content of the first new data block ND.

Furthermore, since the fourth appending requirement AR(4) establishes an always fulfilled requirement, an appending solution AS(j) regarding the appending of only new data blocks ND containing the fourth appending requirement AR(4) can be postponed and selected only after other appending solutions AS(l) regarding more strict requirements have been selected and implemented. Moreover, when an appending solution AS(l) is generated taking into account both new data blocks ND containing the fourth appending requirement AR(4) and new data blocks ND containing more strict requirements, the appending ordering of the new data blocks ND of such appending solution AS(l) is made more flexible since data blocks ND containing the fourth appending requirement AR(4) can be freely appended at any position of the ledger 110.

Moreover, the generation and selection of the appending solution AS(l) may be influenced by a current policy implemented by the ledger 110, such as for example a policy providing each new data block ND with a corresponding priority level (for example based on the importance of the payload of the data block and/or based on the specific requesting node 120 having sent the data block).

Returning to the flow chart of FIG. 6, according to some embodiments of the present invention, the predetermined period of time TP during which new data block(s) ND are received may be directly restarted after that the appending of the selected new data block(s) ND of the selected appending solution AS(l) is carried out, or only when a further new data block ND is received after the appending of the selected new data block(s) ND. Other solutions may be also contemplated, such as for example solutions for which, instead of using a predetermined period of time TP, new data blocks ND are being continuously stored in the buffer module 540 until a predetermined number of stored new data blocks ND is reached.

Although in the flow chart 600 described above the storage manager 505 retrieves (block 604) and identifies (block 606) the appending requirement AR(j) of each received new data block ND before temporarily storing (block 608) the new data block ND into the buffer module 540, similar considerations apply in case the appending requirements AR(j) are retrieved and identified after the storing of the corresponding new data blocks ND into the buffer module 540, such as for example after the expiration of the predetermined period of time TP.

It is pointed out that although in the embodiments of the invention described above in details the operations for managing the appending and the storing of new data blocks are performed by a single storage node 105, the concepts of the present invention can be directly applied to cases in which the appending and the storing of new data blocks is managed by a plurality of storage nodes 105 forming a corresponding storage system.

Another aspect of the present invention relates to a computer program configured for causing a computing system (one or more of the storage nodes 105) to perform the method described above when the computer program is executed on the computing system.

Another aspect of the present invention relates to a corresponding computer program product, the computer program product comprising one or more computer readable storage media having program instructions collectively stored on the readable storage media, the program instructions readable by one or more computing systems (one or more of the storage nodes 105) to cause the computing system to perform the same method.

Generally, the computer program may be implemented as a stand-alone module, as a plug-in for a pre-existing software program (for example, a storage manager and a storage client, respectively, or even directly in the latter). It would be readily apparent that it is also possible to deploy the same solution as a service that is accessed through a network (such as in the Internet). Similar consideration apply if the program is structured in a different way, or if additional modules or functions are provided; likewise, the memory structures may be of other types, or may be replaced with equivalent entities (not necessarily consisting of physical storage media). The program may take any form suitable to be used by any computing system (comprising one or more of the storage nodes 105), thereby configuring the computing system to perform the desired operations; particularly, the program may be in the form of external or resident software, firmware, or microcode (either in object code or in source code), for example, to be compiled or interpreted. Moreover, it is possible to provide the program on any computer readable storage medium. The storage medium is any tangible medium (different from transitory signals per se) that may retain and store instructions for use by the computing system. For example, the storage medium may be of the electronic, magnetic, optical, electromagnetic, infrared, or semiconductor type; examples of such storage medium are fixed disks (where the program may be pre-loaded), removable disks, memory keys (for example, USB), and the like. The program may be downloaded to the computing system from the storage medium or via a network (for example, the Internet, a wide area network and/or a local area network comprising transmission cables, optical fibers, wireless connections, network devices); one or more network adapters in the computing system receive the program from the network and forward it for storage into one or more storage devices of the computing system. In any case, the solution according to an embodiment of the present invention lends itself to be implemented even with a hardware structure (for example, by electronic circuits integrated on one or more chips of semiconductor material), or with a combination of software and hardware suitably programmed or otherwise configured.

An embodiment provides a storage computing system (comprising one or more storage nodes 105) comprising a circuitry(i.e., any hardware suitably configured, for example, by software) for performing each step of the method described above. However, the storage computing system may be of any type (for example, implemented by a physical machine, a virtual machine, a cloud service and so on).

Generally, similar considerations apply if the storage computing system and the whole system has a different structure, comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

Naturally, in order to satisfy local and specific requirements, a person skilled in the art may apply to the invention described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

The invention claimed is:

1. A method for storing a persistent data structure comprising a sequence of data blocks, the method comprising, under the control of a computing system:

at the computing system, receiving a new one of the data blocks to be appended to a last one of the data blocks in the sequence, said new data block containing corresponding data and a corresponding appending requirement selected among a set of pre-defined appending requirements comprising:

a first one of the appending requirements providing that a content and an ordering of all the data blocks of the sequence of data blocks match a corresponding first indication received with the appending requirement, and a further one of the appending requirements providing that a content and an ordering of all the data blocks of a further sequence are at least an initial portion of the sequence matches a corresponding further indication received with the appending requirement, said further sequence identified by a corresponding context, at the computing system, appending said new data block to said last data block conditioned to a fulfillment of said appending requirement contained in the new data block, and at the computing system, storing an indication of the context, wherein each data block in the sequence is associated with a corresponding block, hash that is a hash value of said data block, and with a corresponding link hash that is a hash value based on the block hash of said data block and on the link hash of a previous data block, in the sequence of data blocks, and that is adjacent to said data block wherein:

said first one of the appending requirements provides that the link hash of the last data block matches a link hash comprised in said first indication; and said further one of the appending requirements provides that the link hash of a last data block of the current further sequence matches a link hash comprised in said further indication.

2. The method of claim 1, wherein said set of predefined appending requirements further comprises:

a still further one of the appending requirements providing that a content of the last data block matches a corresponding still further indication received with the appending requirement.

3. The method of claim 2, wherein said still further one of the appending requirements provides that the block hash of the last data block matches a block hash comprised in said still further indication.

4. The method of claim 1, wherein said new data block further contains a context update request providing for an updating of the context to a new context indicative of an extension of the further sequence.

5. The method of claim 4, wherein the context identifying the further sequence corresponds to a lastly appended data block among data blocks of the sequence containing a corresponding context update request.

6. The method of claim 1, wherein said further sequence comprises all the data blocks of the sequence.

7. The method of claim 1, further comprising, at the computing system:

receiving a set of new ones of the data blocks to be appended;

appending at least a selected one of the new ones of the data blocks of the received set to the last one of the data blocks in the sequence conditioned to the appending requirements contained in said received set of new ones of the data blocks.

8. The method of claim 7, wherein said at least a selected one of the data blocks of the received set comprises a plurality of selected data blocks, the method further comprising appending the selected data blocks to the last one of the data blocks in the sequence by ordering the selected data blocks according to the appending requirements contained in the selected data blocks.

9. The method of claim 1, wherein said set of pre-defined appending requirements further comprises an additional one of the appending requirements that is always fulfilled.

10. A computer program product comprising one or more tangible, non-transitory readable storage media having program instructions collectively stored on the one or more tangible, non-transitory readable storage media, the program instructions readable by a computing system to cause the computing system to perform the method of claim 1.

11. A computing system comprising a circuitry for performing each step of the method according to claim 1.

* * * * *